Figure 9:
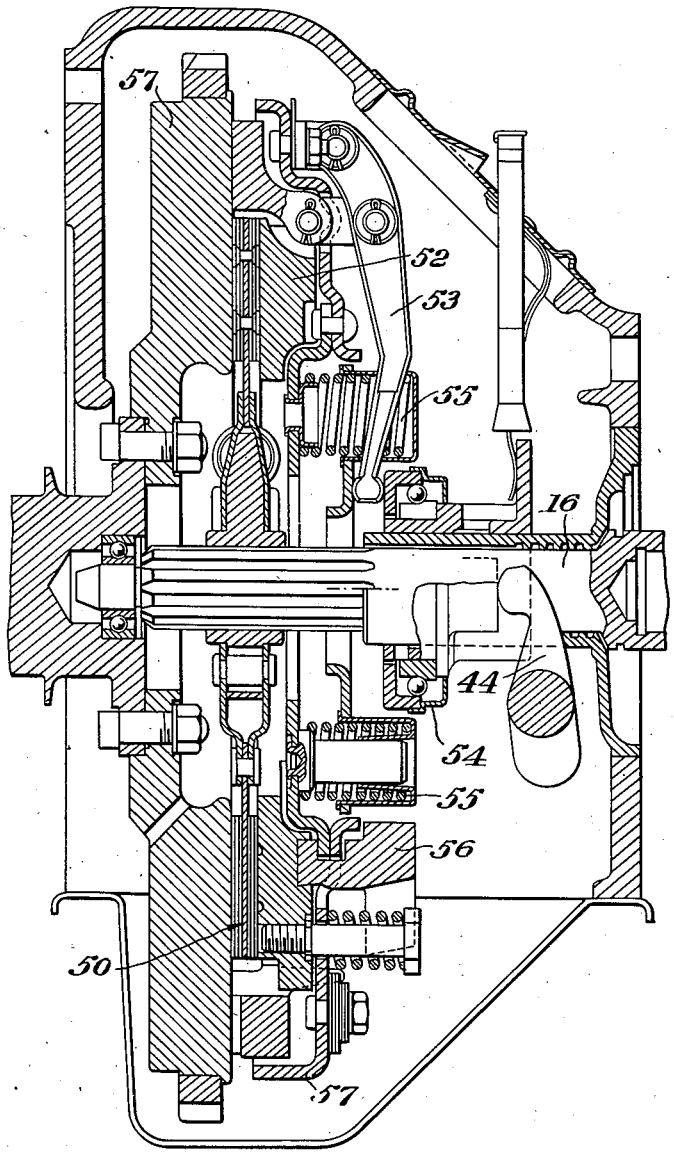

Dec. 1, 1936.  H. H. TIMIAN  2,062,484
IGNITION TIMING DEVICE CONTROL MECHANISM
Filed Oct. 21, 1933   3 Sheets-Sheet 1
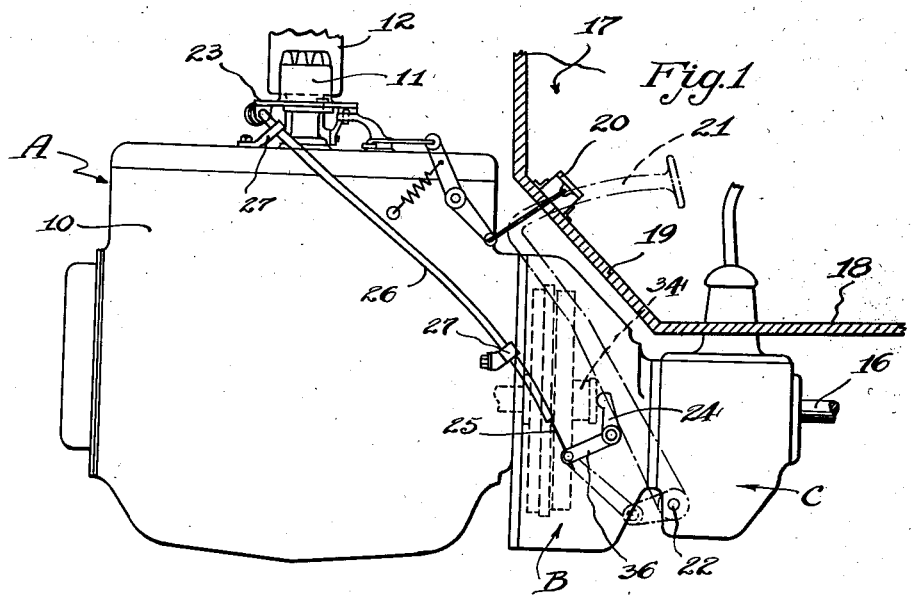
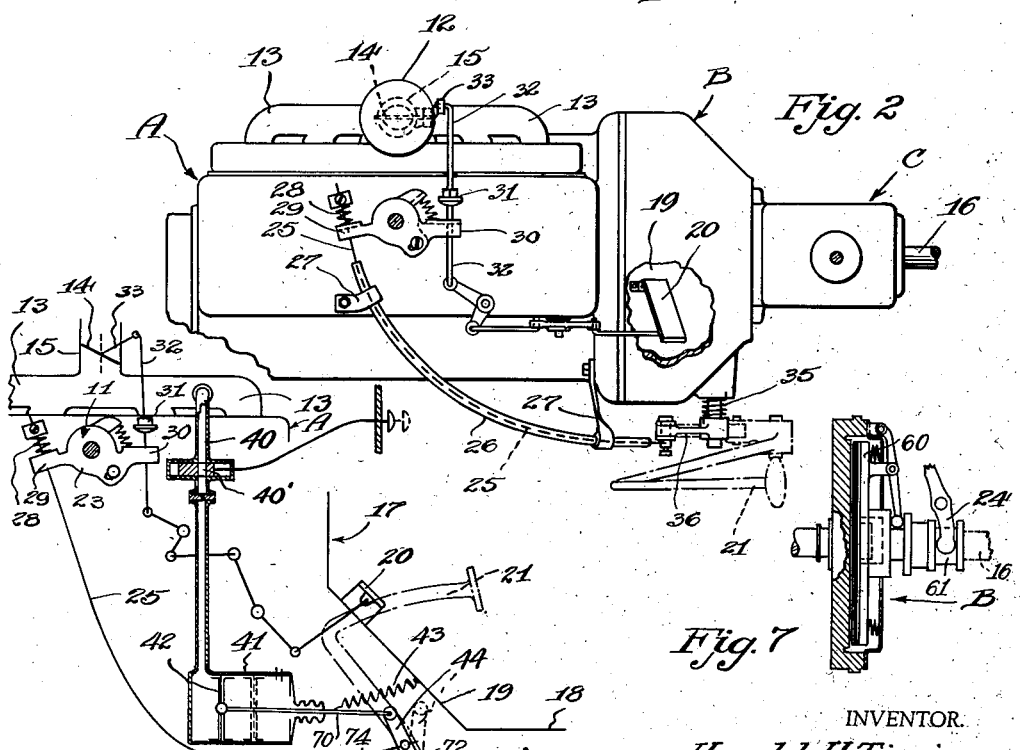
INVENTOR.
Harold H. Timian
BY
ATTORNEY.

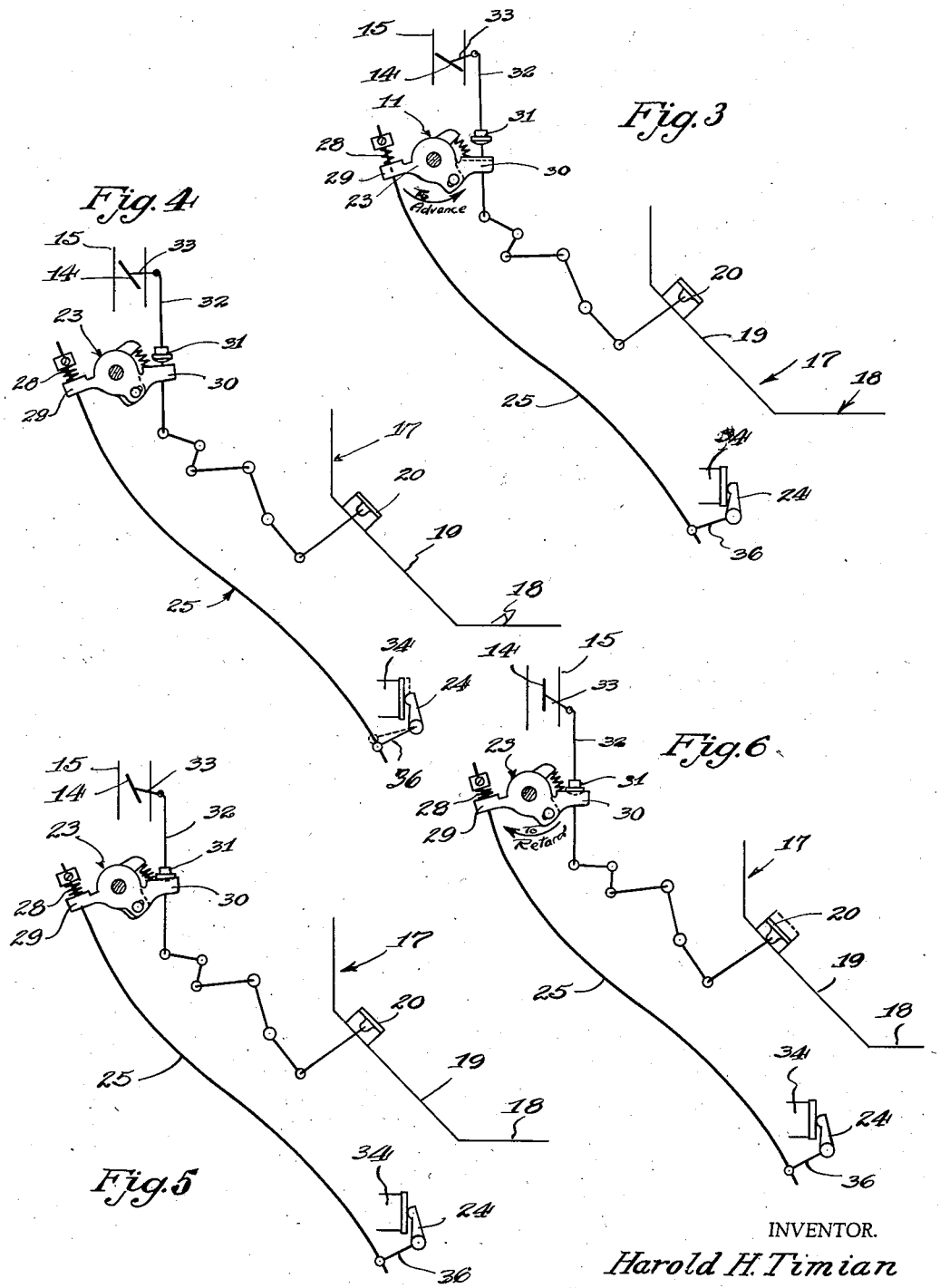

Dec. 1, 1936.   H. H. TIMIAN   2,062,484
IGNITION TIMING DEVICE CONTROL MECHANISM
Filed Oct. 21, 1933   3 Sheets-Sheet 3

Inventor:
HAROLD H. TIMIAN
By
G. F. Hawke.
Attorney.

Patented Dec. 1, 1936

2,062,484

UNITED STATES PATENT OFFICE 2,062,484

IGNITION TIMING DEVICE CONTROL MECHANISM

Harold H. Timian, Detroit, Mich., assignor to Continental Motors Corporation, Detroit, Mich., a corporation of Virginia Application October 21, 1933, Serial No. 694,540

7 Claims. (Cl. 192—.01)

My invention relates to engines and more particularly pertains to a construction for controlling the adjustment of the ignition timing device in accordance with a pre-arranged plan as determined by the engine speed variations.

Heretofore it has been proposed to vary the adjustment of the ignition timing device associated with an internal combustion engine by interconnecting the ignition timing devices with the carburetor throttle control. Such devices have given very satisfactory performance, but mechanical complications have arisen in some instances making it very difficult to control the adjustment of the engine timing with that degree of accuracy as found desirable.

It is an object of my present invention to facilitate the assembly and maintenance of the means acting to adjust the ignition timing device, by providing an ignition timing control mechanism which is simple and positive in operation and which can be readily attached to the engine structure with a minimum of time and labor.

Another object of my invention is to provide a device which is of the utmost simplicity and which is so constructed as to be operable in response to a predetermined engine operation whereby to effect a very accurate and uniform adjustment of a timing device whereby to insure a relatively more efficient engine performance.

A further object of my invention is to provide an automatic ignition timing adjusting device by interconnecting the ignition timing device with a clutching device of the character which is particularly constructed for automatic operation in response to engine operation, and more particularly my invention contemplates connecting the ignition timing device with a vehicle motion control means, and particularly an automatic clutch mechanism, whereby to vary the adjustment of said ignition timing device in response to the clutch action for adjusting the ignition timing device when the clutching device moves into or out of clutching engagement.

A still further object of my present invention is to provide an improved ignition timing device control which is operable to advance the adjustment of the ignition timing device when the clutching device is moved into clutch engagement, and to provide an additional means whereby to effect a retarding of the ignition timing device at or near the time the engine is operated under a relatively heavy load, these respective ignition timing controlling devices being operable substantially independently of each other because of a suitable lost motion connection between the ignition timing device and the control devices associated therewith.

For a more detailed understanding of my invention reference may be had to the accompanying drawings illustrating preferred embodiments of my invention, and in which:

Fig. 1 is a side elevational view of an internal combustion engine showing an ignition timing device and the means for automatically adjusting the timing of said device in response to clutch actuation, Fig. 2 is a plan view thereof which illustrates in more detail the construction and arrangement of the adjusting means for said ignition timing device, Fig. 3 is a diagrammatic illustration of the timer control showing the clutch disengaged and the timer in retarded position, Fig. 4 is a similar diagrammatic view showing the clutch in engaged position and the timer in advanced position, Fig. 5 is a similar diagrammatic view showing the clutch engaged and the timer in an advanced position, but about to be moved to a retarded position by reason of the connection with the carburetor control device, Fig. 6 is a similar diagrammatic view showing the throttle valve open, clutch engaged, and the timer in retarded position, Fig. 7 is a detail sectional diagrammatic view of an ordinary clutch in which a clutch collar is moved toward the engine flywheel for effecting clutch engagement, Fig. 8 is a diagrammatic illustration of a modified form of construction illustrating a timer control constructed in accordance with my invention and assembled with a clutch device actuated in response to suction pressures.

Figure 9A:
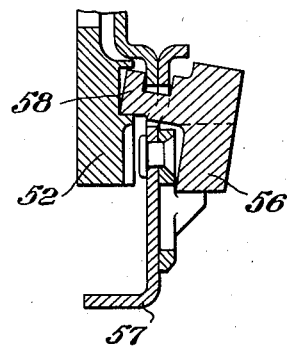

Fig. 9 is a longitudinal sectional view of a conventional centrifugal clutch, and Fig. 9A is a detail fragmentary sectional view of the mechanism whereby to engage the clutch by centrifugally actuated weights.

My present invention is illustrated in the accompanying drawings in connection with an internal combustion engine A which in general consists of an engine block 10 preferably of the multi-cylinder type, and which has associated therewith the usual form of timer or ignition timing device 11, and carburetor 12. The fuel mixture is formed in the carburetor 12 and is conducted to the engine cylinders through the intake manifold 13, the flow of the fuel mixture being controlled by the usual form of throttle valve 14 preferably supported within the primary fuel mixture conducting portion or riser 15. A clutch B and a transmission C are associated with the engine and are preferably located in the usual manner rearwardly of the engine, the engine drive being transmitted through the clutch and transmission to a usual form of propeller shaft 16 that preferably extends towards the rear axle (not shown) of the vehicle 17, said vehicle preferably including suitable body portions such as the floor 18 and the toe board 19, the latter preferably supporting a movable foot accelerator or other throttle valve controlling mechanism 20. The clutch pedal 21 is preferably arranged as shown in Fig. 1 as customary, this clutch pedal 21 being preferably pivoted as at 22 to any suitable support, and actuated to manually control the actuation of the clutch device B.

As stated in the preamble of the specification, it will be noted that I have provided means whereby to control the adjustment of the timer in accordance with engine operation whereby to facilitate improved engine performance. I contemplate the connection of the ignition timing device or timer with the clutch device B in such a way as to vary the adjustment of the timer in response to movement of the clutch device into and out of clutch engagement. Preferably, I prefer to provide a construction in which the adjustment of the timer is retarded during idling engine speed and prior to the engagement of the clutching device, but on moving the clutching device into clutch engagement, I preferably advance the timer to improve engine operation and maintain said timer in such advance adjustment substantially throughout the intermediate stages of engine loadings.

It will be further noted that efficient engine performance may best be had at relatively high engine loadings by retarding the ignition timing device, and in the present instance I have preferably connected the timer with the throttle valve actuating mechanism in such a way as to retard the adjustment of the timer when the throttle valve is wide open, suitable lost motion connections being provided to permit this final adjustment.

My invention is preferably associated with an internal combustion engine which is provided with an automatic clutching device, and I find that the connection of the adjustable portion of the timer with the clutching device provides for a very simple construction, and one which is subject to a simple operation for varying the adjustment of said timer in accordance with a pre-arranged plan. Preferably the connection between the adjustable means or plate 23 carried by the engine timing device or timer and the clutch device B is provided for by connecting the clutch throwout lever 24 with said plate 23 by means of a Bowden wire 25 or other suitable operating connection, this Bowden wire being preferably supported in the tube 26 which is supported on the engine structure by means of brackets 27, and yieldingly connected to the plate by means of the spring or other suitable yielding device 28. The plate 23 is provided with an arm 29 which is yieldingly engaged by said spring 28 and this plate further carries an arm 30 which is adapted to be engaged by a collar 31 carried on the rod 32 which is suitably connected with the throttle valve actuating lever 33 associated with said throttle valve 14.

It will be obvious that insofar as the present invention is concerned that the device for controlling the timing of the ignition timing device is of such a character as to permit the same to be assembled with an engine having an automatic clutch device other than that of the type illustrated in the accompanying drawings. In order to illustrate one application of my invention, I preferably show my invention as being associated with a centrifugal automatic clutch of the type shown in Figs. 9 and 9A identical in construction as illustrated on page 674 of Automotive Industries of June 3, 1933, in which the clutch is of such a character as to provide a clutch disc which is moved into engagement with the flywheel of the engine by means of a plurality of centrifugal weights which are actuated in response to centrifugal forces induced by the rotation of the flywheel, these weights being of such a character as to be actuated for effecting a vehicle drive by said engine without danger of stalling the engine.

The automatic clutch herein illustrated in Figs. 9 and 9A comprises a driven clutch disc 50 operatively connected with the shaft 16 in a conventional manner, and driven by the flywheel 51 and driving or pressure plate 52. The pressure plate is preferably actuated in a conventional manner for standard foot pedal operation by means of levers 53, clutch throw out collar 54 and springs 55. Said pressure plate 52 is also preferably moved into engagement with the driven disc 50 by means of the weights 56 which are rocked by centrifugal forces produced by engine operation, as shown in Fig. 9A, said weight being supported by the stationary reaction plate 57. The centrifugal weight or weights 56 have a rectangularly shaped foot 58 which is clamped between the reaction plate 57 and pressure plate 52. The tipping of the weight causes said foot 58 to yieldingly separate the pressure plate from the reaction plate, and thus moves the pressure plate into driving engagement with the driven disc 50.

In a clutching device as above referred to, it will be noted that the clutch collar actuating lever 24 is induced to follow the clutch collar 34, as the same is moved inwardly of the clutch device toward the engine flywheel, by means of a spring 35 or other suitable yielding actuating means, and therefore, by connecting the Bowden wire 25 to the lever 24 by means of the arm 36, it will be plainly evident that the motion of the lever 24 is transmitted directly to the Bowden wire 25 and thus actuation of the adjustable plate member 23 of the timer is obtained for varying the adjustment of said timer as the clutch is moved into or out of clutch engagement, the timer being preferably advanced as the clutch is moved into clutching engagement and retarded when the clutching device is moved out of clutching engagement.

It will be obvious that when my invention is incorporated with an automatic clutching device of a type different than the one illustrated, that various arrangements and different forms of structure may be necessary, and my present invention is of the type illustrated for the reason that this general arrangement and construction is particularly applicable to a clutch of the type herein broadly illustrated. I do not therefore limit my invention to any particular type of automatic clutch since the scope of said claims is such as to be applicable to any type of clutch found suitable for use in engines of the type specified.

In the illustrated embodiment of my invention, it will be noted that, as the lever 24 is moved when the clutching device is moved into clutching engagement, the Bowden wire connection 25 is actuated and by reason of its connection with the adjustable plate 23 of the timing device, the said timer is adjusted to an advanced position. In speeding up the engine subsequent to the initial engagement of the clutching device, there is an inappreciable movement of the lever 24 and thus the timer is maintained substantially in the advanced position.

It is preferable in order to obtain an efficient engine performance for relatively high engine loadings to retard the adjustment of the ignition timing device at the time such relatively high engine loadings are reached. Such relatively high engine loadings are generally reached when the throttle valve nears wide open position, and thus I preferably provide means connecting the throttle valve actuating devices with the timer for retarding said timer when the throttle valve is opened wide, the collar 31 carried by the rod 32 which actuates the throttle valve lever being arranged to engage the arm 30 of the timer when the throttle valve nears wide open position and to move said arm on further actuation of said throttle valve, any predetermined amount whereby to obtain any desired retardation of the timer when said throttle valve is wide open.

Figs. 3 to 6 inclusive diagrammatically illustrate the operation of my device. In Fig. 3 it will be noted that the clutch collar 34 is positioned for clutch disengagement, the timer is adjusted in a retarded position and the throttle valve 14 is substantially closed, said throttle valve being merely opened a small amount for engine idling. The next step in the operation of my improved timer control is illustrated in Fig. 4 and in this figure it will be noted that the throttle valve is partially opened which increases engine speed and actuates the automatic clutching device to move the same into clutching position, the clutch collar 34 moving to the left and carrying with it the lever 24 by reason of the spring 35. The Bowden wire is connected with an arm 36 which is moved together with the lever 24 and thus the plate 23 is adjusted to an advanced position on moving the clutching device into clutching engagement. In Fig. 5 the throttle is opened to a wider extent than as shown in Fig. 4 but the timer is still adjusted to an advanced position. However, the arm 30 of the timer plate 23 is just being engaged by the collar 31 and further movement of the rod 32 carrying with it the collar 31 acts to move the plate 23 or rotate the same against the tension of the spring 28, and thus the plate is progressively moved in a clockwise direction on opening the throttle valve from the position shown in Fig. 5 to that shown in Fig. 6, so as to adjust the timer to a predetermined retarded position as shown in Fig. 6. If desired, the final retarding of the timer by the throttle valve actuation may be such as to finally adjust the timer in a retarded position intermediate the full advance and the complete retarded.

Fig. 7 shows a conventional clutch B embodying a pressure plate 60 and clutch collar 61, said collar being moved toward the pressure plate 60 in effecting a clutch engagement, the clutch collar actuating lever 24 being arranged in a conventional manner to move the collar 61 away from the pressure plate on depressing the cooperating clutch pedal for releasing the clutch.

In Fig. 8 it will be noted that I have illustrated a modified form of construction, my invention being here shown in connection with an automatic clutch of the type which is controlled by differential pressure. In this construction, it will be noted that I have provided a conduit 40 connecting the cylinder 41 with the intake manifold 13, said conduit being provided with a suitable valve 40'. For idling speeds of engine operation the vacuum pressure in the manifold 13 is at a maximum and thus the piston 42 is moved over to the left as seen in Fig. 8 and as shown in full lines. On increasing engine speed, the vacuum in the manifold 13 is reduced and the spring 43 may exert a force on the piston 42 to move the said piston to the dotted line position, thus moving the arm 44 to which the Bowden wire 25 is connected. With the construction shown in Fig. 8, the operation of the timer adjustment and the throttle valve actuation is substantially the same as illustrated in the preferred embodiment of my invention as shown in Figs. 1 to 6 inclusive.

The piston 42 is connected with the clutch collar actuating lever 44 by a link 70 and it will be observed that lever 44 is moved to the dotted line position as the engine speed is increased to move the clutch collar towards the pressure plate to engage the clutch and when the lever 44 is moved to the full line position the clutch collar is moved away from the pressure plate for declutching operation. Depressing of pedal 21 also carries the lever 44 to be moved in a counterclockwise direction by rocking same on its supporting shaft 72 by the link 73 and lever 74 to declutch the clutch.

It is desirable in some instances to provide a control device or other suitable means for cutting out the automatic operation of the clutch whenever desired, and since this control does not form any part of my present invention, the same is not illustrated herein.

It will be noted that my present invention provides a very simple construction which is positively actuated and provides for an accurate adjustment of the timer, whereby to obtain an improved engine performance. My present invention necessitates the employment of a suitable connecting means intermediate the timer and a clutch and preferably I find it desirable to attach the Bowden wire 25 which serves as said connecting means to the clutch collar actuating lever which is moved on actuating the clutching device.

It will be apparent to those skilled in the art to which my invention pertains that various modifications and changes may be made therein without departing from the spirit of my invention or from the scope of the appended claims.

What I claim as my invention is:

1. In a device of the character described for an engine having an ignition timing device, a clutch associated with said engine, a timer adjusting member associated with said ignition timing device, a throttle device for controlling engine fuel mixture supply, means connecting said clutch with said timer adjusting member and operable in response to clutch operation for adjusting said ignition timing device independently of the throttle device operation, and other means connecting said ignition timing device with the throttle device whereby to effect a further adjustment of said ignition timing device in response to the actuation of said throttle device.

2. In a device of the character described for an engine having an ignition timing device, an automatic clutching device associated with said engine and including an element moving in response to engine speed variations, timer adjusting means associated with said ignition timing device, and means connecting said element with said timer adjusting means whereby to adjust said timer in response to engine speed variations.

3. In a device of the character described for an engine having an ignition timing device, an automatic clutching device associated with said engine and adapted to be moved into clutching engagement when a predetermined engine speed is attained, and means connected with said clutching device and operable on moving said device into clutching engagement for advancing the adjustment of said ignition timing device.

4. In a device of the character described for an engine having an ignition timing device, an automatic clutching device associated with said engine and adapted to be moved into clutching engagement when a predetermined engine speed is attained, means connected with said clutching device and operable on moving said device into clutching engagement for advancing the adjustment of said ignition timing device, and other means operable in response to the engine load controlling device for retarding the adjustment of said ignition timing device for relative high load engine operation.

5. In a device of the character described for an engine having an ignition timing device, an automatic clutching device associated with said engine and adapted to be moved into clutching engagement when a predetermined engine speed is attained, a fuel mixture supply system for said engine and including a carburetor and throttle valve for controlling the fuel mixture delivered to the engine, means connecting said ignition timing device with said automatic clutching device and operable on moving said device into clutching engagement for advancing said ignition timing device, and means connecting said throttle valve with said ignition timing device for retarding the adjustment of said ignition timing device in response to the adjustment of said throttle valve for relatively high load engine operation.

6. In a device of the character described for an engine having an ignition timing device, an automatic clutching device associated with said engine and adapted to be moved into and out of clutch engagement in response to engine speed variations, said device including an actuating means, means connecting said actuating means with said ignition timing device whereby to vary the adjustment of said ignition timing device on moving said clutching device into and out of clutch engagement.

7. In a device of the character described for a vehicle propelling engine having an ignition timing device, an automatic vehicle motion controlling device, means connecting said devices and operable in response to the actuation of the vehicle motion controlling device for varying the adjustment of said ignition timing device, means controlling engine loading, and other means connecting the engine loading controlling means with the ignition timing device for varying the adjustment of said ignition timing device in response to actuation of said engine loading controlling means.

HAROLD H. TIMIAN.